United States Patent [19]

Someya

[11] Patent Number: 4,952,972

[45] Date of Patent: Aug. 28, 1990

[54] LIFE EXPIRATION DETECTOR FOR LIGHT SOURCE OF IMAGE PROCESSING APPARATUS

[75] Inventor: Akihiko Someya, Yokohama, Japan

[73] Assignee: Kabushiki Kaisha Toshiba, Kawasaki, Japan

[21] Appl. No.: 426,046

[22] Filed: Oct. 24, 1989

[30] Foreign Application Priority Data

Oct. 26, 1988 [JP] Japan .................. 63-270213

[51] Int. Cl.$^5$ ............................. G03B 27/74
[52] U.S. Cl. ..................... 355/68; 250/226; 315/134; 356/406; 356/418; 356/425; 358/475
[58] Field of Search ............ 355/229, 68, 38, 32; 356/43, 45, 406, 416, 418, 419, 425; 374/9; 362/20; 250/226; 358/475, 461, 464; 315/134

[56] References Cited

U.S. PATENT DOCUMENTS

| | | | |
|---|---|---|---|
| 3,806,249 | 4/1974 | Lesinski ......................... | 356/45 |
| 4,061,428 | 12/1977 | Amano et al. ................... | 356/418 X |
| 4,281,932 | 8/1981 | Young ............................ | 356/425 X |
| 4,396,288 | 8/1983 | Helphrey ....................... | 356/419 X |
| 4,417,822 | 12/1983 | Stein et al. ..................... | 356/45 X |
| 4,645,358 | 2/1987 | Blume ............................ | 374/9 |
| 4,746,987 | 5/1988 | Traino et al. ................... | 358/475 |
| 4,833,525 | 5/1989 | Suzuki et al. ................... | 356/45 X |
| 4,834,541 | 5/1989 | Yamaba ......................... | 256/419 X |

Primary Examiner—Fred L. Braun
Assistant Examiner—Sandra L. Hoffman
Attorney, Agent, or Firm—Foley & Lardner, Schwartz, Jeffery, Schwaab, Mack, Blumenthal & Evans

[57] ABSTRACT

An image forming apparatus includes a detector for detecting light intensities of light from a light source, and a discrimination unit for obtaining the relative ratio of chroma signals of light with two or more wavelengths at the light intensities of the light source detected by the detector, to thereby discriminate life expiration of the light source. Data of the relative ratio of chroma signals of light with two or more wavelengths at a time of life expiration of the light source is obtained in advance. Thereafter, the light intensity of the light source is detected to obtain the actual relative ratio of the chroma signals of light with two or more wavelengths. Based on these data, the life expiration of the light source is discriminated.

9 Claims, 16 Drawing Sheets

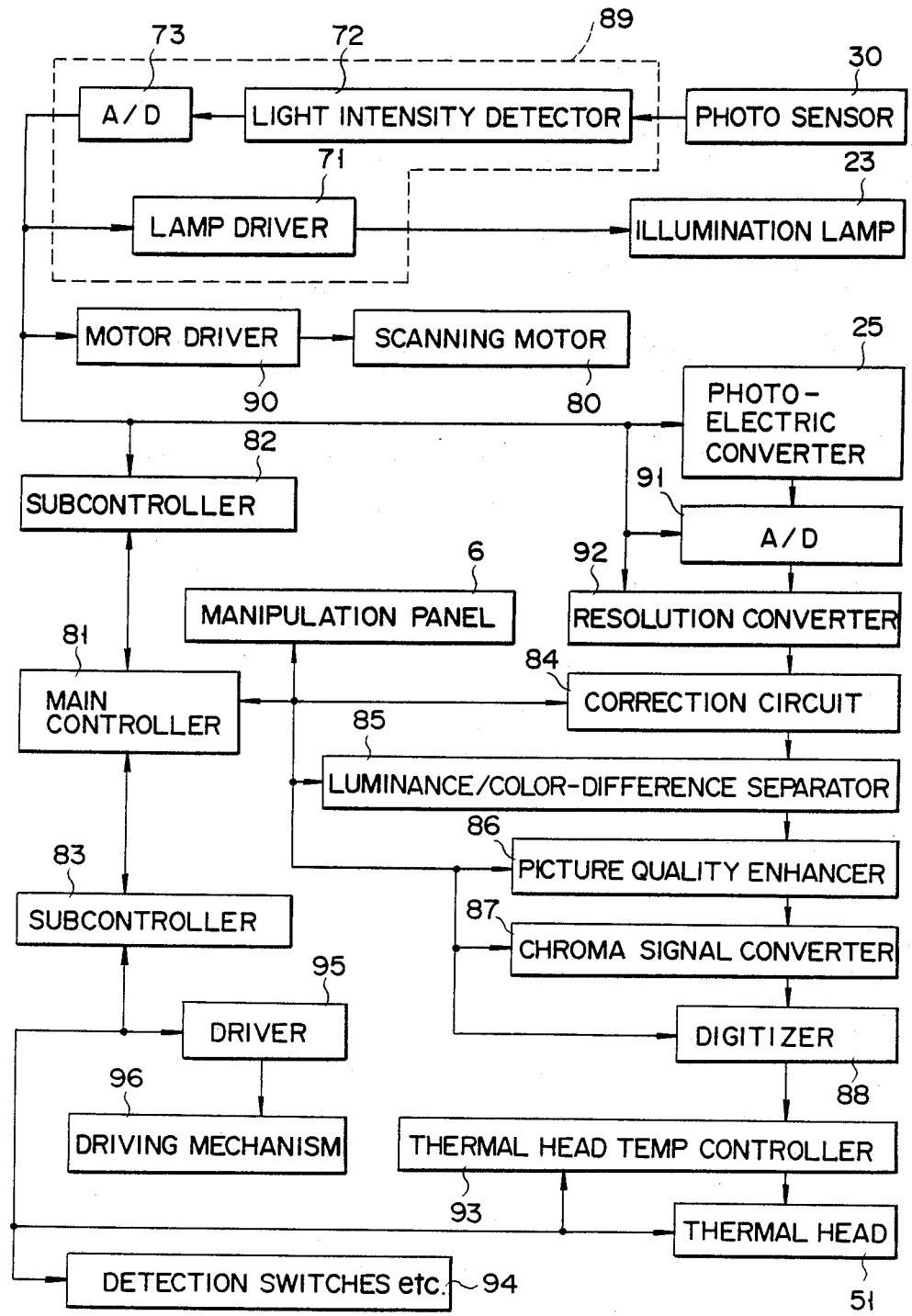
F I G. 1

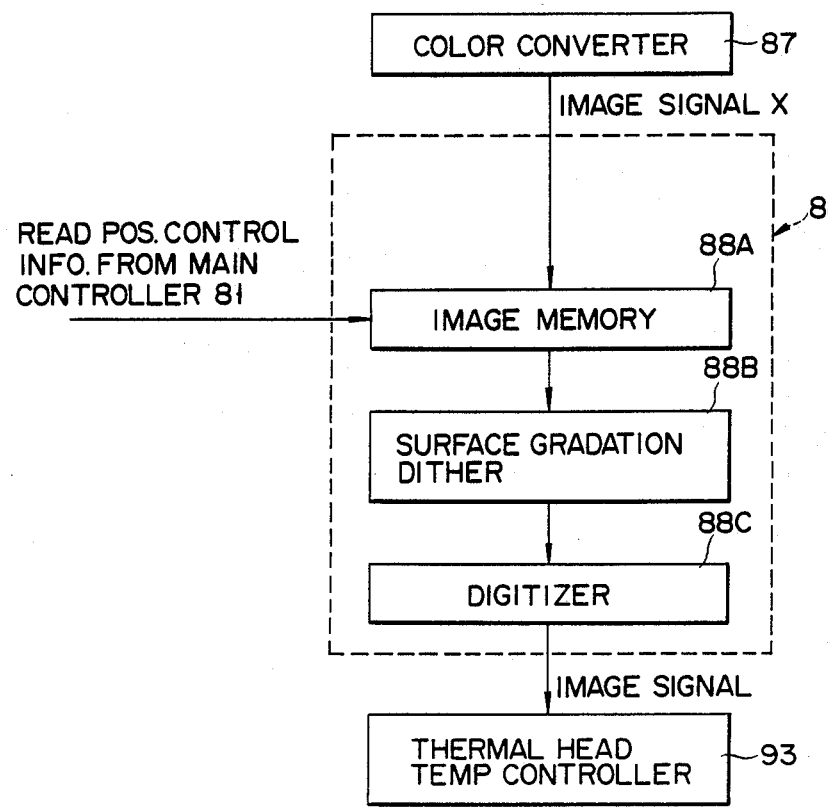
F I G. 2A

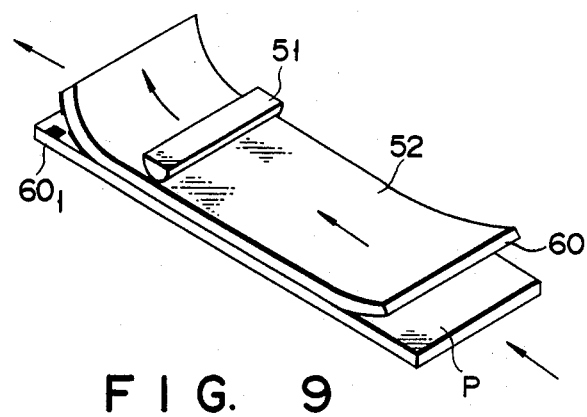
F I G. 9
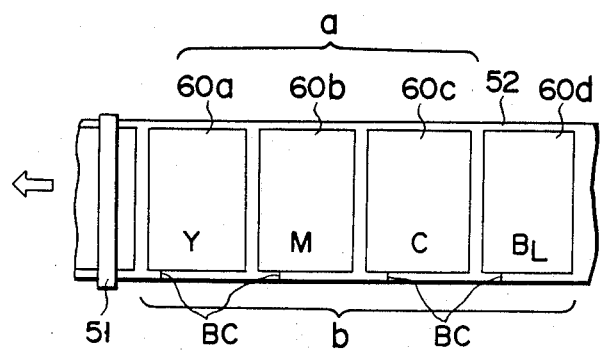
F I G. 10

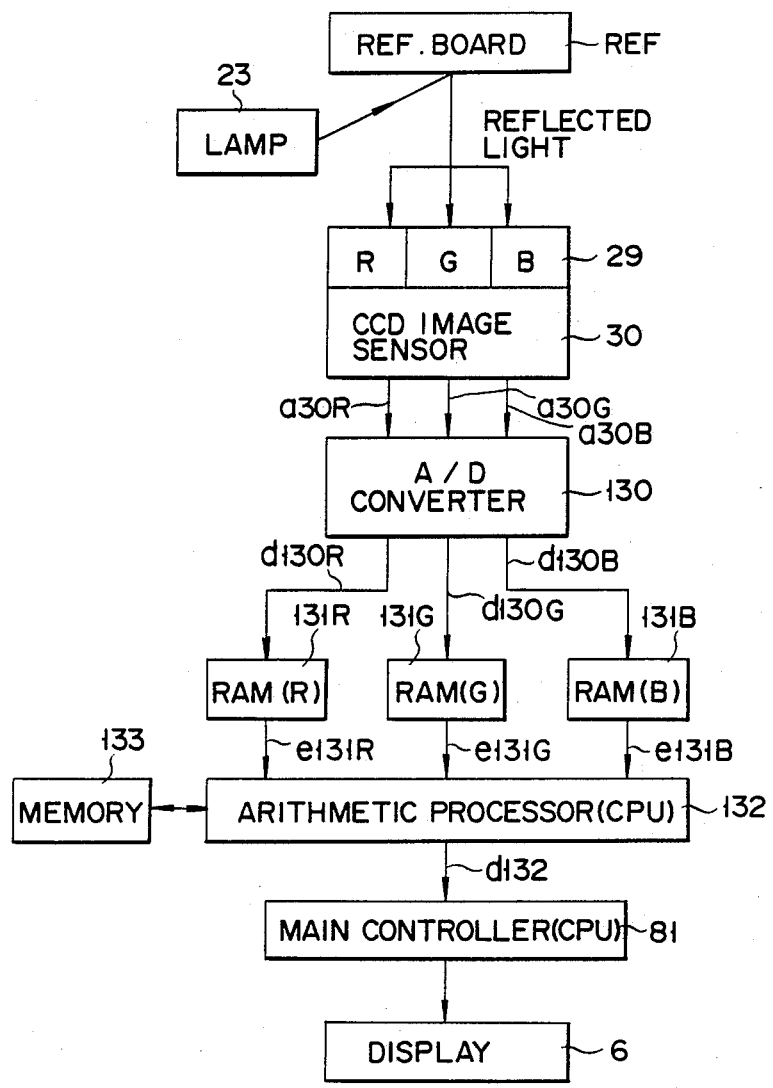
F I G. 13

LIFE EXPIRATION DETECTOR FOR LIGHT SOURCE OF IMAGE PROCESSING APPARATUS

BACKGROUND OF THE INVENTION

1. Field of the Invention

The present invention relates to an image forming apparatus such as a thermal copying machine equipped with a scanner to irradiate light from an illumination lamp onto an original and read out image data from the reflected light.

2. Description of the Related Art

In a thermal color copying machine which uses a thermal ink ribbon with plural types of colors to make a color copy, for example, light is irradiated onto an original from an illumination lamp (light source), image data of the original is optically read out from the reflected light, and this image data is converted into color data corresponding to the individual inks of the thermal ink ribbon. In accordance with the color data, ink of the associated ink portion of the thermal ink ribbon is melted by a thermal head (heat-sensitive head) and transferred onto a sheet of paper (image-forming medium). In this manner, different colors are sequentially transferred onto the paper to make a color copy.

In some of the above type thermal color copying machines, the life expiration of the lamp is checked on the basis of the intensity of light from the lamp. In other words, the lamp's life expiration is checked on the basis of reduction in intensity of light. If the required intensity of light cannot be provided from a lamp in use any more, this lamp needs replacement.

Even if there is a sufficient intensity of light to scan a monochromatic original (two-colored (black and white) original), however, the ratio of chroma signals of light (relative ratio of red (R), green (G) and blue (B)) may actually vary due to reduction in color temperature of light which is caused by deterioration of the lamp. In this case, the color copying machine of the aforementioned type which checks the life expiration of the lamp based only on the intensity of light, cannot discriminate color imbalance caused by deterioration of the lamp. When a user uses a lamp whose life expiration has already been reached, without being aware of a change in ratio of R, G and B, therefore, the color tone of a color original cannot be reproduced with a high fidelity.

SUMMARY OF THE INVENTION

Accordingly, it is an object of this invention to provide an image forming apparatus which can accurately check a change in color balance due to deterioration of a light source to thereby enhance color reproducibility.

The image forming apparatus of the present invention comprises means for detecting the intensity of light from a light source and means for discriminating the life expiration of the light source by obtaining a relative ratio of chroma signals of light with two or more types of wavelengths in the intensity of light of the light source detected by the detecting means.

According to the present invention, data about the relative ratio of chroma signals of light with two or more types of wavelengths at the expected end of the life expiration of the light source is obtained in advance. Thereafter, the intensity of light from the light source is detected to acquire the actual relative ratio of chroma signals of light with two or mote types of wavelengths for discrimination of the life expiration of the light source.

BRIEF DESCRIPTION OF THE DRAWINGS

FIG. 1 is a block diagram illustrating the arrangement of an electric system for use in a thermal color copying machine as an example of an image forming apparatus to which the present invention is applicable;

FIG. 2A is a diagram for explaining in detail a digitizer 88 as shown in FIG. 1;

FIG. 9 is a diagram for explaining how an image is transferred onto a copy paper P from a thermal ink ribbon;

FIG. 10 is a diagram illustrating the arrangement of a color thermal ink ribbon;

FIG. 13 is a block diagram illustrating the structure of hardware which discriminates the life expiration of the light source of the copying machine shown in FIG. 5;

DETAILED DESCRIPTION OF THE PREFERRED EMBODIMENTS

A preferred embodiment of this invention will no be described referring to the accompanying drawings.

Figure 5:
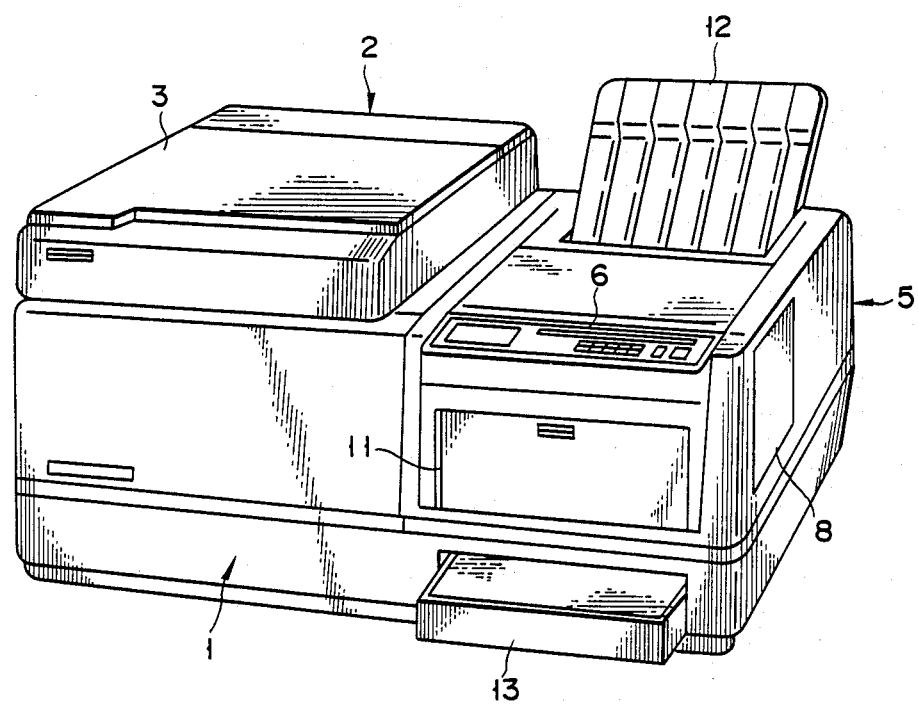
FIG. 5 is a perspective view illustrating the outline of a thermal color copying machine as an example of an image forming apparatus to which the present invention is applicable.
Figure 6:
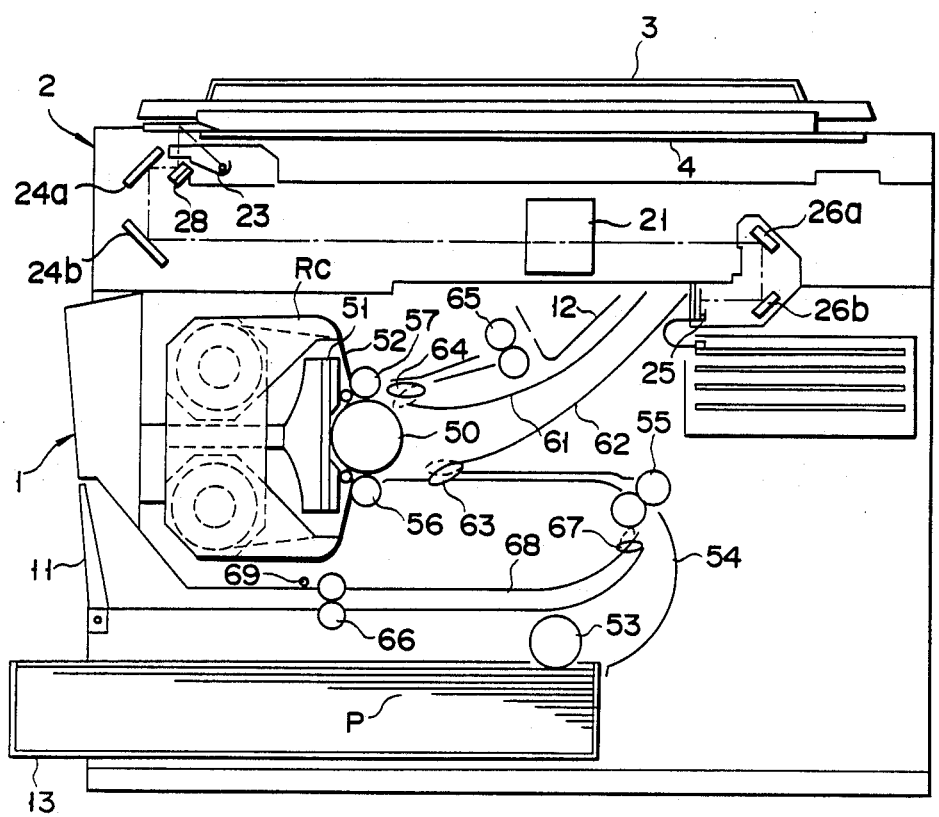
FIG. 6 is a diagram illustrating part of the internal structure of the copying machine shown in FIG. 5.

FIGS. 5 and 6 illustrates a thermal color copying machine as one example of an image forming apparatus. An image data scanner 2 is detachably mounted on the top portion of a main body 1. This scanner 2 is provided with an openable original cover 3. Below the cover 3 lies an original stand 4 made of transparent glass. The scanner 2 causes its exposure optical system to reciprocate along the bottom surface of the original stand 4 to optically scan an original placed on the original stand and photoelectrically converts the attained optical data into an electric signal. The data converted by the scanner 2 is supplied to an image forming unit 5 detachably mounted on the right side of the main body 1. The image forming unit 5 forms an image on a sheet of paper as an image-forming medium in accordance with the converted data.

A manipulation panel 6 is provided on the top front of the image forming unit 5. A guide section 11 used for manual paper feeding is openably provided on the front of the image forming unit 5, and a paper receiving tray 12 for receiving a sheet of paper having an image transferred thereon is provided on the top of the unit 5. Further, a paper feeding cassette 13 capable of holding plural sheets of paper P is loadably provided in the main body 1 lying under the image forming unit 5. Reference numeral 8 denotes a door through which a thermal ink ribbon (to be described later) as a transfer agent is set or detached.

Figure 7A:
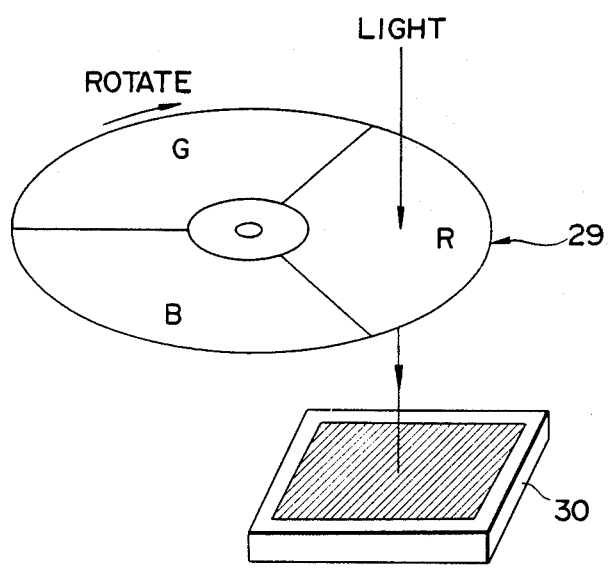
FIG. 7A is a diagram illustrating that optical portion of the optical system shown in FIG. 7 which separates and detects R, G and B components of light from the light source 23.
Figure 7:
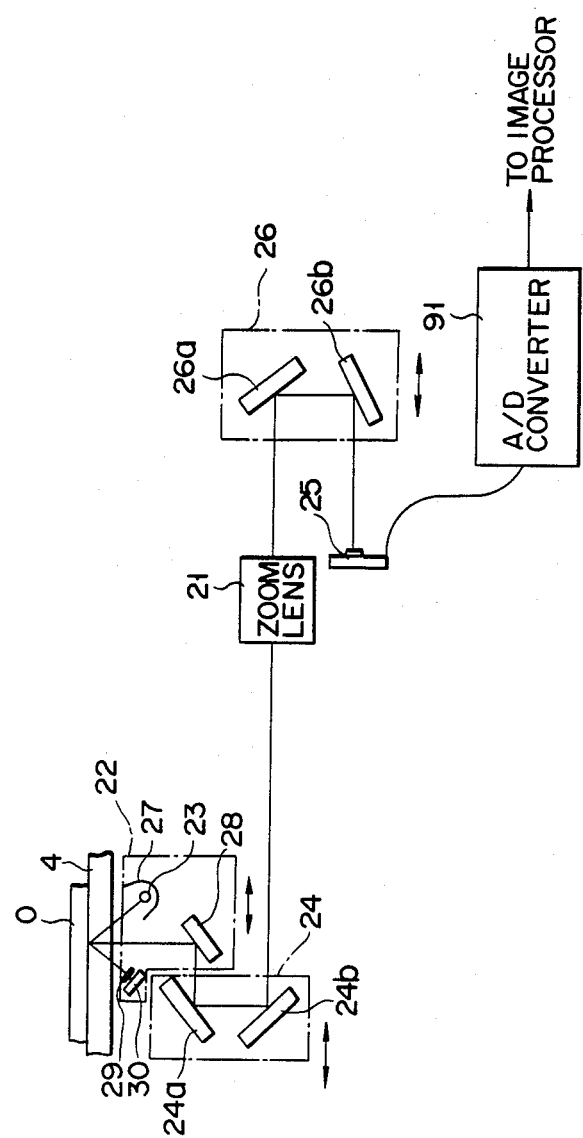
FIG. 7 is a schematic diagram illustrating an optical system of the copying machine shown in FIG. 5.
Figure 8:
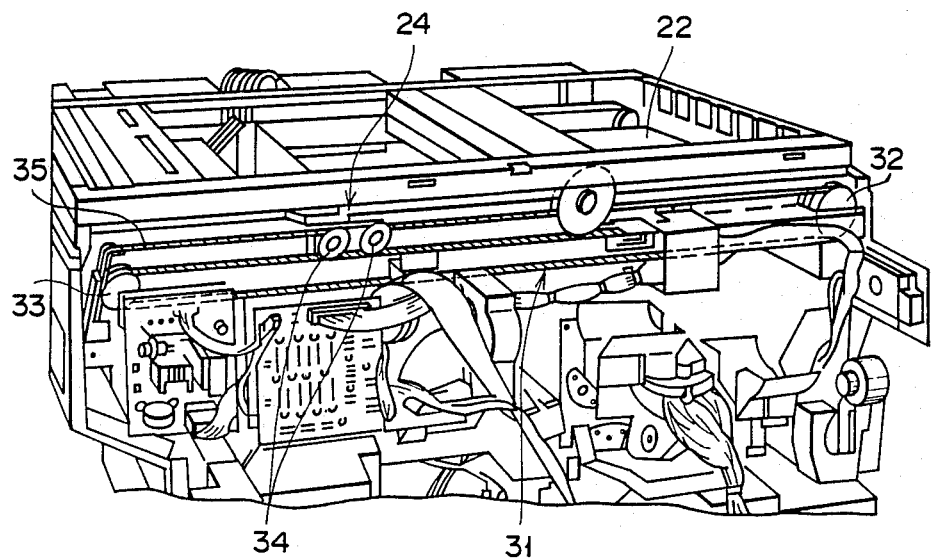
FIG. 8 is a diagram illustrating another portion of the internal structure of the copying machine shown in FIG. 5.

As shown in FIGS. 6 to 8, for example, the image data scanner 2 comprises a first carriage 22 having an illumination lamp 23 as a light source, etc. mounted thereon, a second carriage 24 for deflecting an optical path by means of a mirror, a zoom lens 21, a mirror section 26 for guiding the reflected light from an original O to a photoelectric converter 25 and compensating the length of the optical path when magnification is changed, the photoelectric converter 25 for receiving the reflected light from the original O, and a driving system (not shown) for altering the positions of these individual elements.

As shown in FIG. 7, the first carriage 22 is mounted with the illumination lamp 2 for irradiating light onto the original O, a reflector 27 for converging light from the lamp 23 onto the surface of the original O, a mirror 28 for guiding the reflected light from the original O toward the second carriage 24, a filter section 29 and a photosensor (detecting means) 30. The filter section 29 has a red (R) filter, a green (G) filter and a blue (B) filter, and also has a mechanism (see FIG. 7A) for selectively inserting the R, G and B filters onto the light-receiving portion of the photosensor 30. In checking the life expiration of the illumination lamp 23, for example, this mechanism sets the R, G and B filters one by one on the photosensor 30 to separate the reflected light from a white original (reference original) into light components with different wavelengths associated with R, G and B and supplies the light components with the three types of wavelengths to the photosensor 30. The R, G and B primary-color filters in the filter section 29 may be replaced with C (cyan), G (green) and Y (yellow) color filters.

The second carriage 24 is mounted with mirrors 24a and 24b for guiding the light led by the mirror 28 to the zoom lens 21. As shown in FIG. 8, the first and second carriages 22 and 24 are connected together by a timing belt 31 so that the second carriage 24 moves in the same direction at half the speed of the first carriage 22. This permits scanning in such a way that the optical path to the zoom lens 21 is constant.

The zoom lens 21 has a fixed focus distance and is therefore moved along the optical axis when magnification is change.

As shown in FIG. 7, the mirror section 26 comprises two mirrors 26a and 26b whose positions change in accordance with a change in length of the optical path associated with the selected magnification. Light from the zoom lens 21 is deflected by the two mirrors 26a and 26b to guide it the photoelectric converter 25.

The photoelectric converter 25 performs photoelectric conversion of the reflected light from the original O to separate image data of the original O into C, G and Y (or R, G and B) chroma signals and output them. This converter 25 is mainly constituted by a CCD type line image sensor. In this case, one pixel of the original O corresponds to three consecutive elements (C, G and Y) of the CCD sensor. The output of the photoelectric converter 25 is supplied to an A/D converter 91 which will be described later.

The first carriage 22, second carriage 24, zoom lens 21 and mirror section 26 are each moved by a stepping motor (not shown).

As shown in FIG. 8, the first and second carriages 22 and 24 are moved in accordance with the movement of the timing belt 35 stretching between a drive pulley 32 coupled to the rotational shaft of the stepping motor and idle pulleys 33 and 34.

The mirror section 26 and zoom lens 21 are moved by separate stepping motors (not shown). The zoom lens 1 has its spiral shaft (not shown) rotated by the associated stepping motor and moves along the optical shaft by the movement of this shaft.

Both of the mirror section 26 and photoelectric converter 25 may arranged in one bracket so that the mirrors 26a, 26b and the photoelectric converter 25 are moved integrally.

The image forming unit 5 has a platen 50 disposed at approximately the center portion and a thermal head 51 serving as a recording head (heat-sensitive head disposed in front of the platen 50 (on the left in FIG. 6) so that the head 51 can come into contact with or move away from the platen (see FIG. 6).

Further, the thermal head 51 is accommodated in the space within a ribbon cassette Rc with a thermal ink ribbon (thermal ribbon) 52 coming between the head 51 and the platen 50. With the ink 52 in this position, when paper (image-forming medium) is pressed against the platen 50 and heating elements (not shown) of the thermal head 51 formed in line dots is heated in accordance with color data, ink on the ink ribbon 52 is heated and melted onto the paper.

A paper feeding roller 53 is provided obliquely below the platen 50 in the main body 1 to feed out sheets of paper P from the paper feeding cassette 13 one by one. The fed-out paper P is guided, passing through a paper guiding path 54, to a resist roller 55 located obliquely above the paper feeding roller 53, and has its fore edge aligned by this roller 55. The paper P is then fed to the platen 50 and wound around it by pressing rollers 56 and 57. In this manner, the paper P can be accurately fed to the platen 50.

A manual feeding detecting switch 69 constituted by, for example, a photocoupler, which detects paper manually fed, is provided in the guide section 11. A pair of rollers 66, which is operated in accordance with the detection by this switch 69 to supply the manually-fed paper, are also provided in the guide section 11. The paper supplied by the roller pair 66 is guided to the resist roller 55 through a guide path 68 and a switch 67 constituted by a microswitch, for example, and is accurately supplied to the platen 50 to be wound therearound, as described above.

The switch 67 is normally ON and is turned OFF when paper passes therethrough. The guide section 11 is provided with manual-feeding guides (not shown) which are set in accordance with the width of paper when the paper is supplied. Data of the mutual distance between the manual-feeding guides is supplied to a main controller (to be described later).

The thermal head 51 presses the paper P against the platen 50 through the thermal ink ribbon 52, and transfers ink $60_1$ onto the paper P by melting ink 60 on the ink ribbon 52 with heat, as shown in FIG. 9.

The thermal ink ribbon 52 has Y, M and C ink sections 60a, 60b and 60c arranged in substantially the same size as the paper P as indicated by the range "a" in FIG. 10 or Y, M, C and BL (black) ink sections 60a, 60b, 60c and 60d as indicated by the range "b." The paper P is returned to the ink-transfer start position for each color so that the colors are accurately and sequentially placed one on another.

Those side edge portions of the thermal ink ribbon 52 which correspond to the respective ink portions 60a–60d are provided with bar codes BC necessary for discriminating the ink portions 60a–60d and align the fore end of each of the ink portions 60a–60d with the fore end of the paper P. The bar codes BC are read out by a bar code detector (not shown).

When the black ink portion 60d is provided on the thermal ink ribbon 52, this ink portion is used to make black clearer. Even without the black ink portion 60d, black can substantially be made by putting the three colors (60a–60c) one on another.

The paper P is reciprocated by the number of colors by the rotation of the platen 50, and the path of the paper P is led onto first and second guides 61 and 62 sequentially provided along the bottom surface of the paper receiving tray 12.

Ink transfer will now be described referring to FIGS. 11A–11D. First, paper P fed out from the paper feeding cassette 13 passes through a section where the resist roller 55 and a first separate gate 63 are located and is wound around the platen 50 (see FIG. 11A).

Then, the platen 50 is rotated by a pulse motor as a drive source (not shown) to feed the paper P at a given speed, and the heating elements (not shown) of the thermal head 51 formed in line dots along the shaft of the platen 50 are heated in accordance with color data, whereby the ink 60 on the ink ribbon 52 is transferred onto the paper P.

Figure 11A:
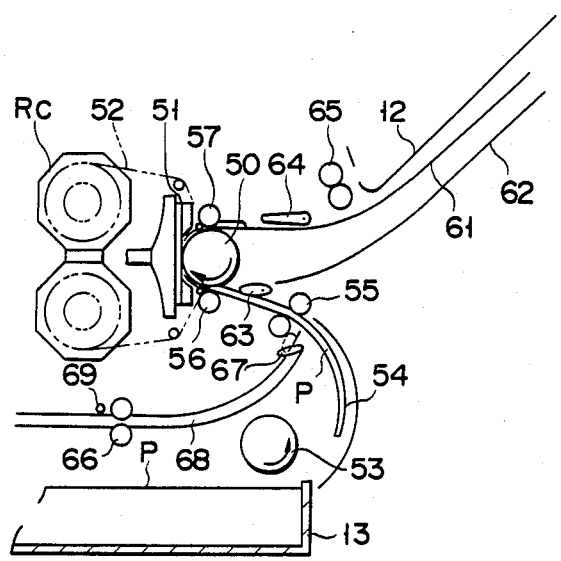
FIGS. 11A through 11D are diagrams for explaining a sequence of procedures for transferring an image onto the copy paper P.
Figure 11B:
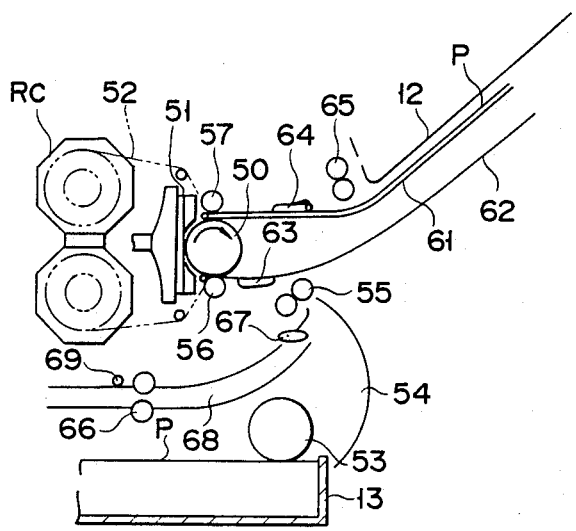

The fore end of the paper P passing the platen 50 is sent over the first guide 61 provided along the bottom surface of the paper receiving tray 12 by a second separate gate 64 (see FIG. 11B).

Figure 11C:
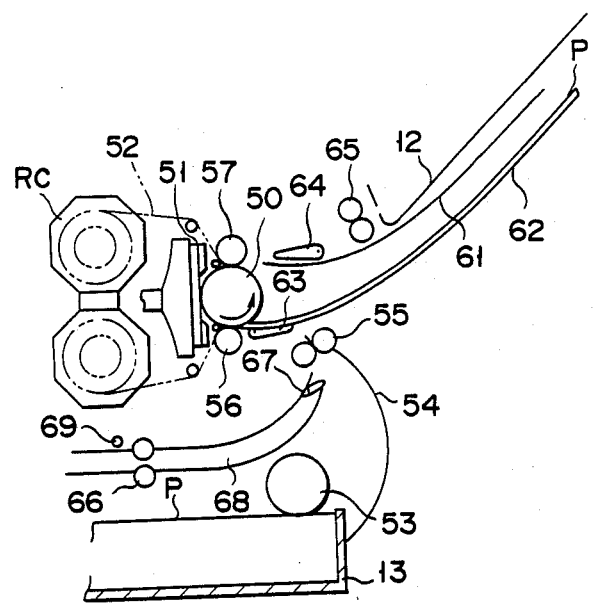

The paper P having one color ink 60 transferred thereon in this manner is sent back by the reverse rotation of the platen 50 and is sent over the second guide 62 provided along the bottom surface of the first guide 61 by a change in rotation of the first separate gate 63 (see FIG. 11C).

A plurality of colors can be transferred onto the paper P by reciprocally moving the paper P in the above manner.

Figure 11D:
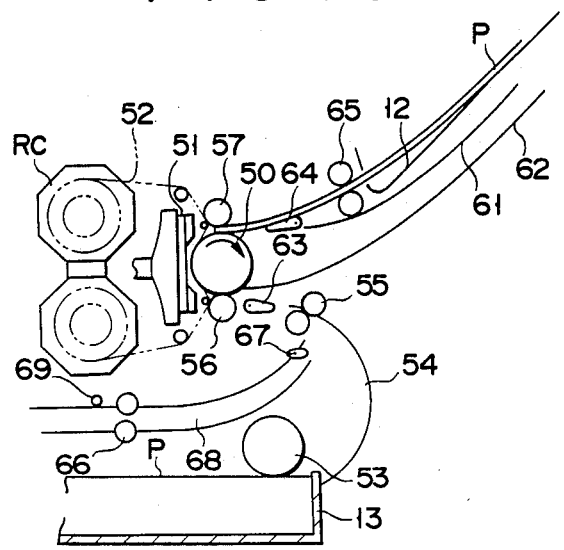

Finally, the paper P having all the required colors transferred thereon is guided to a pair of paper discharging rollers 65 by the second separate gate 64, and is discharged onto the paper receiving tray 12 (see FIG. 11D).

With paper manually fed, although not illustrated, the paper is supplied to the position of the resist roller 55 by the roller pair 66 and is then subjected to ink transfer as described above.

Figure 12:
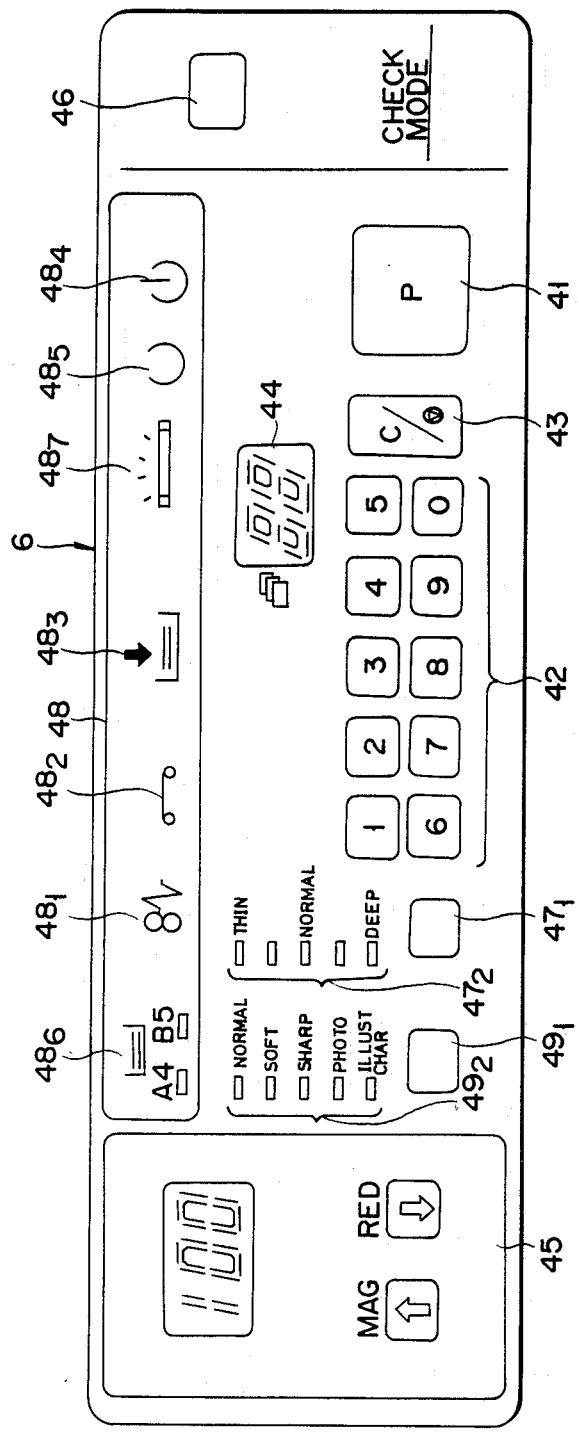
FIG. 12 is a diagram exemplifying a display section and a switch arrangement on a manipulation panel 6 of the copying machine shown in FIG. 5.

FIG. 12 illustrates the aforementioned manipulation panel 6. This panel 6 is provided with a print key 41 for instructing the start of printing (image formation), ten keys 42 for specifying the number of prints, a clear/stop key 43 for instructing to clear the print number specified and instructing to stop printing, a number indicator 44 for displaying the number of prints, etc., a magnification setting section 45 for setting a magnification (magnifying ratio) of an image to be formed, a display 48 for displaying various data, an original mode key $49_1$ for selecting a mode in accordance with the quality of the original, a display $49_2$ for displaying the selected mode, a density specifying key $47_1$ for selectively setting the printing density in five levels, a display $47_2$ for displaying the set density, and a check mode specifying key 46 operable in checking the life expiration of the illumination lamp 23.

The display 48 comprises a jam indicator $48_1$ which is lit when paper jamming occurs in the main body 1, a ribbon indicator $48_2$ for indicating various statuses such as no more available ribbon in the ribbon cassette Rc mounted in the main body 1 and not cassette mounted, a paper indicator $48_3$ for indicating the loading status of the paper feeding cassette 13 or presence/absence of paper, a print disable indicator $48_4$ and a print enable indicator $48_5$ for indicating the status of the main body 1, a size indicator $48_6$ for indicating the size of paper in the loaded paper feeding cassette 13, and a lamp life expiration indicator $48_7$ for indicating the life expiration of the illumination lamp in check mode.

FIG. 1 schematically illustrates the general control system which comprises a main controller 81, a first sub-controller 82 and a second sub-controller 82. The main controller 81 is coupled to the manipulation panel 6, a correction circuit 84, a luminance/color-difference separator 85, a picture quality enhancer, a chroma signal converter 87, a digitizer 88, the first sub-controller 82 and the second sub-controller 83, and controls the operation of all the mentioned units.

The first sub-controller 82 is coupled to a light source controller 89, a motor driver 90, the photoelectric converter 25, the A/D converter 91 and a resolution converter 92, and controls the operation of these units. The light source controller 89 comprises, for example, a lamp driver 71 for controlling the activation of the illumination lamp 23 and the intensity light therefrom, a light intensity detector 72 for detecting the intensity of light from the lamp 23 from the output of the photosensor 30, and an A/D converter 73 for subjecting the output of the detector 72 to A/D conversion. The motor driver 90 drives a scanning motor (stepping motor) 80 which moves the first and second carriage 22 and 24, for example.

The second sub-controller 83 is coupled to a thermal head temperature controller 93, the thermal head 51, various detection switches 94 and a driver 95, and controls the operation of these units. The driver 95 is coupled to a driving mechanism 96 such as a motor and solenoid for driving the zoom lens 21, mirror section 26, platen 50, etc.

The correction circuit 84 executes normalization (shading correction or correction of variation in the photoelectric converter 25) based on the image data (after resolution conversion) attained by A/D conversion of the reflected light from the original and the reference data.

Figure 2:
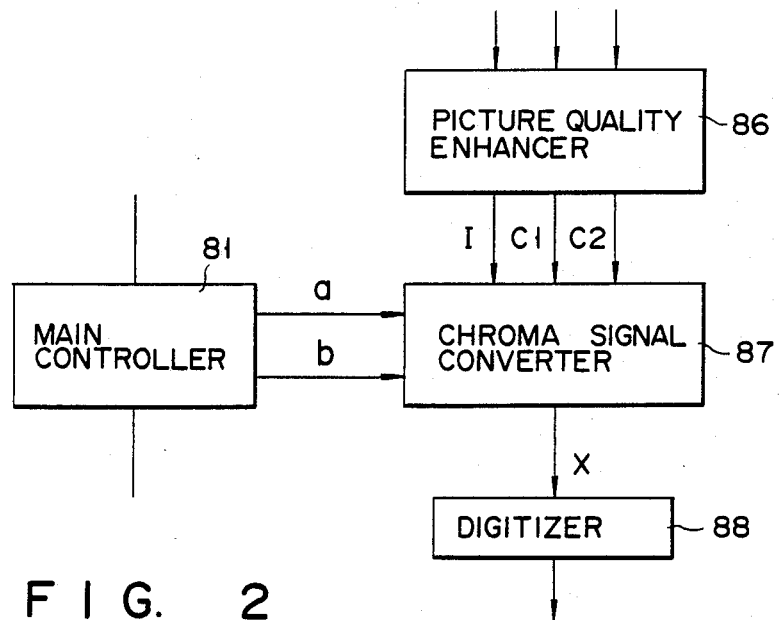
FIG. 2 is a diagram for explaining in detail a chroma signal converter 87 as shown in FIG. 1.

FIG. 2 is presented for a further description of the chroma signal converter 87. This chroma signal converter 87 outputs to the digitizer 88 a signal x which is attained by selecting one of Y, M, C and $B_L$ chroma signals from a luminance signal (I), a color-difference signal 1 (C1) and a color difference signal 2 (C2) from the picture quality enhancer 86. The selection of Y, M, C, or $B_L$ chroma signal is done by the main controller 81. More specifically, the main controller 81 selects one of the Y, M, C and $B_L$ chroma signals sent to the digitizer by a combination of signals a and b, as indicated in the following Table 1. The chroma signals are automatically selected one by one by a command from the main controller 81 (e.g., in the sequence of Y→M→C→$B_L$).

TABLE 1

| a | b | x |
|---|---|---|
| 0 | 0 | Y |
| 0 | 1 | M |
| 1 | 0 | C |
| 1 | 1 | $B_L$ |

The digitizer 88 has a memory 88A (FIG. 2A) for storing four (Y, M, C and $B_L$) chroma signals from the chroma signal converter 87 as data of positions on the original for each color. In accordance with a command from the main controller 81, a pseudo gradation is given, by a dither 88B, to the chroma signal of each position stored in the memory 88A and the resultant signal is digitized by a digitizer 88C. Four digital chroma signals each having a pseudo gradation are then selectively output.

A description will now be given of the normal copying operation with the above arrangement. Assume now that a user has specified the copying conditions such as a copying magnification using the manipulation panel 6 (FIG. 12), placed an original on the original stand 4, then pressed the print key 41 on the panel 6. Then, the main controller 81 (FIG. 1) controls the driving mechanism 96 through the second sub-controller 83 and driver 95 to move the zoom lens 21, etc. in accordance with the specified magnification. The main controller 81 also controls the first sub-controller 8 and the lamp driver 71 of the light source controller 89 to turn on the illumination lamp 23 and drives the scanning motor 80 through the first sub-controller 82 and motor driver 90 to move the first and second carriages 22 and 24. As a result, light from the illumination lamp 23 (see FIG. 6) is irradiated onto the original through the original stand 4.

The reflected light from the original is led to the photoelectric converter 25 sequentially through the mirrors 28, 24a and 24b, zoom lens 21 and mirrors 26a and 26b (see FIG. 7). The photoelectric converter 25 (such as a CCD linear image sensor with color filters) separates the reflected light into analog C, G and Y chroma signals, which are then sent to the A/D converter 91.

The A/D converter 91 converts each analog chroma signal into a digital signal. The signals from the A/D converter 91 associated with the original are sent out the resolution converter 92.

The resolution converter 92 (FIG. 1) performs resolution conversion to make the resolution of the photoelectric converter 25 (e.g., 400 dots per inch) coincide with that of the thermal head 51 (e.g., 200 dots per inch), and the conversion result is sent to the correction circuit 84.

The correction circuit 84 normalizes the individual C, G and Y chroma signals from the resolution converter 92 using reference data and executes a process for correcting a variation in the photoelectric converter 25 (shading correction). The result of the correction is sent to the luminance/color-difference separator 85.

The separator 85 subjects the C, G and Y chroma signals from the correction circuit 84 to various arithmetic operations to separate them into a luminance signal (I), a color difference signal 1 (C1) and a color difference signal 2 (C2), where are in turn sent to the picture quality enhancer 86.

The picture quality enhancer 86 analyzes the received signals and performs a picture quality enhancing process such as edge emphasis. The resultant signals are sent to the chroma signal converter 87.

The converter 87 performs color conversion based on the luminance signal and color difference signals 1 and 2 undergone the picture quality enhancement to convert them into one (a signal corresponding to densities) of Y, M, C and $B_L$ chroma signals (primary colors (Y, M and C) at the time of printing pulse black ($B_L$)). This signal is sent to the digitizer 88.

The digitizer 88 (FIG. 2A) executes surface gradation conversion (88B) using a dither method and digitalization on the chroma signal (one of Y, M, C and $B_L$) from the chroma signal converter 87. The digital signal is sent to the thermal head temperature controller 93.

Based on the digital signal from the digitizer 88 and position data from the second sub-controller 83 (FIG. 1), this controller 93 a print signal (color data) to the thermal head 51.

Meantime, the driving mechanism 96 is controlled through the second sub controller 83 and driver 95 by a command given from the main controller 81 in response to the pressing of the print key 41 on the manipulation panel 6 (FIG. 12), so that the paper feeding roller 53, resist roller 55 and platen 50 are driven. As shown in FIG. 11A, a sheet of paper P in the paper feeding cassette 13 is fed out by the roller 53 and this paper P is fed through the paper guide path 54 by the roller 55. The paper P is guided via the pressing roller 56 to the platen 50 and is wound therearound.

Under the above situation, when the paper P is supplied to the printing position of the thermal head 51 by the rotation of the platen 50, the head 51 melts color ink 60 (e.g., $60_1$) of the thermal ink ribbon 52, which is associated with a print signal, to execute printing (image forming) on the paper P wound around the platen 50, as shown in FIG. 9.

When multi-color printing by superimposing one color on another or monochromatic printing is completed, the main controller 81 controls the first sub-controller 82 and the lamp driver 71 of the light source controller 89 to turn off the illumination lamp 23. The driving mechanism 96 is controlled through the second sub-controller 83 and driver 95 so that the paper P around the platen 50 is discharged on the tray 12, as shown in FIG. 11B, for example, thus completing the copying operation.

If paper is manually fed from the guide section 11 (FIG. 6), the copying operation is executed in the same manner as described above.

A description will now be given of the case where the check mode specifying key 46 on the manipulation panel 6 (FIG. 12) is operated.

Upon pressing the key 46, the red, green and blue filters of the filter section 29 in FIG. 7A are inserted over the light receiving portion of the photosensor 30 one by one by driving means (not shown).

When a white original, for example, is placed on the original stand 4 (FIG. 6) and the print key 41 on the manipulation panel 6 is pressed, the main controller 81 (FIG. 1) controls the light source controller 89 and motor driver 90 through the first sub-controller 82. As a result, the illumination lamp 23 is turned ON by the lamp driver 71 of the controller 89 and the scanning motor 80 is driven by the motor driver 90.

Consequently, light from the illumination lamp 23 is irradiated onto the white original through the original stand 4, and the reflected light from this original enters the photosensor 30 through the filter section 29. In this case, the photosensor 30 receives light passing each filter by inserting the individual filters of the filter section 29 onto the light receiving portion of the photosensor 30 with the scanning of the white original.

Upon completion of scanning the white original, the main controller 81 causes the first sub-controller 82 to control the lamp driver 71 of the light source controller 81 to thereby turn the illumination lamp OFF. Further, the motor driver 90 is controlled to drive the scanning motor 80 to thereby set the first carriage 22 at a predetermined position.

The output of the photosensor 30 (FIG. 1) is supplied to the light intensity detector 72 of the light source controller 89. The detector 72 detects the light intensity of each of R, G and B components from the outputs of the photosensor 30 attained by executing color separation by the filter section 29 (FIG. 7A). The detection result of the detector 72 is sent to the A/D converter 73 where it is subjected to A/D conversion. The resultant signal is supplied through the first sub-controller 82 to the main controller 81.

Based on data of the light intensities of the R, G and B components supplied from the A/D converter 73, the main controller 81 acquires a ratio of these components and checks whether or not the life of the illumination lamp 23 has expired (whether or not the lamp should be replaced with a new one) from, for example, a change in ratio of the R, G and B components (change in balance). If it is discriminated that the life expiration of the lamp 23 has reached, the main controller 81 turns on the lamp life expiration indicator 48₇ of the display 48 on the manipulation panel 6 to inform a user of the event.

The relation between the life expiration of the lamp 23 and chroma signals (R, G, B) of light will be described below.

Assume that the illumination lamp 23 (FIG. 7) is constituted by a fluorescent lamp which irradiates white light using a plurality of fluorescent members. Even if one of the fluorescent members is deteriorated, the balance between the R, G and B components of the white light would be changed. With such a lamp 23 in use, a reproduced (printed) image of a color original or the like is influenced by such a change in white balance, thus deteriorating the color reproducibility.

Figures 3A, 3B:
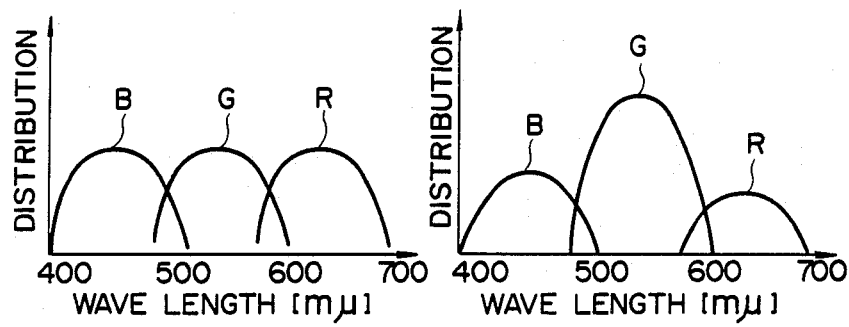
FIG. 3A is a graph exemplifying the intensity distribution of the individual color components, R, G and B, in a case where a light source 23 is constituted by a combination of plural types of fluorescent lamps and it is new and provides the normal white balance.
FIG. 3B is a graph exemplifying the intensity distribution of the R, G and B components in a case where the light source 23 in FIG. 3A is deteriorated and does not provide the normal white balance any more.

FIG. 3A illustrates that the R, G, B components of white light are in ideal state. In this case, provided that the distribution of the intensities of the R, G and B color components are given by functions R(x), G(x) and B(x), respectively, the individual components can be expressed as follows:

$$R = \int_{-a}^{a} R(x)dx \quad (1)$$

$$G = \int_{-b}^{b} G(x)dx$$

$$B = \int_{-c}^{c} B(x)dx$$

where x is a wavelength, +a denotes the range of integration for red, +b denotes the range of integration for green, and +c denotes the range of integration for blue.

If the lamp 23 is deteriorated to cause a change in R, G and B components as shown in FIG. 3B, the functions R(x), G(x) and B(x) are varied. Accordingly, the R, B and B color components do not represent an accurate white balance. Further, resolution in A/D conversion for the color components whose intensities are decreased due to deterioration of the lamp is also reduced, thus resulting in probable color deterioration or reproduction of the wrong color.

Figures 4A, 4B:
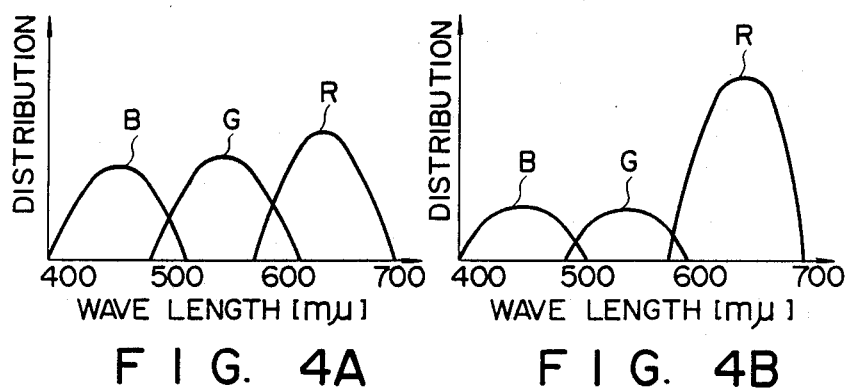
FIG. 4A is a graph exemplifying the intensity distribution of the R, G and B components in a case where the light source 23 is constituted by a halogen lamp which is new.
FIG. 4B is a graph exemplifying the intensity distribution of the R, G and B components in a case where the light source 23 is deteriorated and the white balance is significantly broken.

If the illumination lamp 23 is constituted by a halogen lamp, the light intensity of the R component (FIG. 4A), which is originally very large, becomes even greater (i.e., the function R(x) significantly varies (see FIG. 4B)). Therefore, the function R(x) cannot be corrected by the shading correction alone, thus adversely influencing color reproduction (i.e., breading the white balance).

In view of the above, the main controller 81 discriminates the life expiration of the illumination lamp 23 from the ratio (balance; for example, $\int Rdx/\int Gdx$, $\int Bdx/\int Gdx$) of the light intensities of the R, G and B components attained when a white original is scanned. In other words, using a change in R, G and B components which influences color reproduction, the ratio ($\int Rds/\int Gds$, etc.) of the R, G, B components at the threshold (life expiration of the lamp 23) of that change in R, G and B components which does not influence color reproduction much, is compared with check level data (e.g., 0.6) as a reference point. This discrimination is executed by, for example, a processor 132 shown in FIG. 13 and the check level data is stored in advance in a memory 133.

The life expiration of the lamp may be checked by the hardware arrangement as shown in FIG. 13.

A white reference plate REF for determining reference white is placed on the original stand 4 in FIG. 7 and light is irradiated onto this white reference plate REF from the lamp 23 whose life expiration is to be checked. The reflected light from the white reference plate REF is input to the photosensor 30 through the RGB filter 29.

The photosensor 30 sends the three primary color analog signals a30R, a30G and a30B subjected to color separation by the RGB filter 29, to an A/D converter 130. The A/D converter 130 subjects these analog signals to, for example, 8-bit A/D conversion and writes 8-bit digital signals d131R, d131G, d131B having 256 gradation levels into RAMs 131R, 131G and 131B, respectively.

-bit digital signals e131R, e131G, e131B read out from the RAMs 131R, 131G and 131B are input to an arithmetic processor 132 where the following arithmetic operations are executed:

$$Rh = (Rh1 + Rh2 + \ldots + RhN)/N \quad (2)$$
$$Gh = (Gh1 + Gh2 + \ldots + GhN)/N$$
$$Bh = (Bh1 + Bh2 + \ldots + BhN)/N$$

where Rh represents the average of the digital signal e131R (red component with respect to the reference white) for specific or non-specific N pixels read out from the RAM 131R, Gh represents the average of the digital signal e131G (green component with respect to the reference white) for specific or non-specific N pixels read out from the RAM 131G, and Bh represents the aver age of the digital signal e131B (blue component with respect to the reference white) for specific or non-specific N pixels read out from the RAM 131B. The computed average data is stored in the memory 133.

Similarly, a black reference plate REF for determining reference black is placed on the original stand 4 and light is irradiated onto this black reference plate REF from the lamp 23 whose life expiration is to be checked. The reflected light from the black reference plate RE is input to the photosensor 30 through the RGB filter 29.

Incidentally, the black reference plate can be omitted if the lamp 23 is turned-off when data of the black reference is to be obtained. The output of photosensor 30 obtained when the lamp 23 is OFF can be used as the black reference data.

The three primary color signals a30R, a30G and a30B are digitized through the A/D converter 130 and written in the RAMs 131R, 131G and 131B, respectively. Digital signals e131R, e131G, e131B read out from the RAMs 131R, 131G and 131B are input to an arithmetic processor 132 where the following arithmetic operations are executed:

$$Rb = (Rb1 + Rb2 + \ldots + RbN)/N \quad (3)$$
$$Gb = (Gb1 + Gb2 + \ldots + GbN)/N$$
$$Bb = (Bb1 + Bb2 + \ldots + BbN)/N$$

where Rb represents the average of the digital signal e131R (red component with respect to the reference black) for specific or non-specific N pixels read out from the RAM 131R, Gb represents the average of the digital signal e131G (green component with respect to the reference black) for specific or non-specific N pixels read out from the RAM 131G, and Bb represents the average of the digital signal e131B (blue component with respect to the reference black) for specific or non-specific N pixels read out from the RAM 131B. The computed averages are stored in the memory 133.

Substituting Rh, Gh, Bh, Rb, Gb and Bb obtained from the equations (2) and (3) into the following equation (4) yields lamp life expiration check data NR, NG and NB.

$$NR = (Rh - Rb)/256 \quad (4)$$
$$NG = (Gh - Gb)/256$$
$$NB = (Bh - Bb)/256$$

If any of the data NR, NG and NB obtained by the equation (4) is reduced below, for example, 0.6, it is discriminated that the life expiration of the lamp 23 has reached. The denominator "256" in the equation (4) indicates the number of gradation levels of the data Rh, Rb, Gh, Gb, Bh and Bb.

Upon reception of the result of the discrimination, the main controller 81, flickers a predetermined display element (e.g., $48_7$ in FIG. 12) on the manipulation panel 6 to inform a user that the lamp need replacement.

Figure 14:
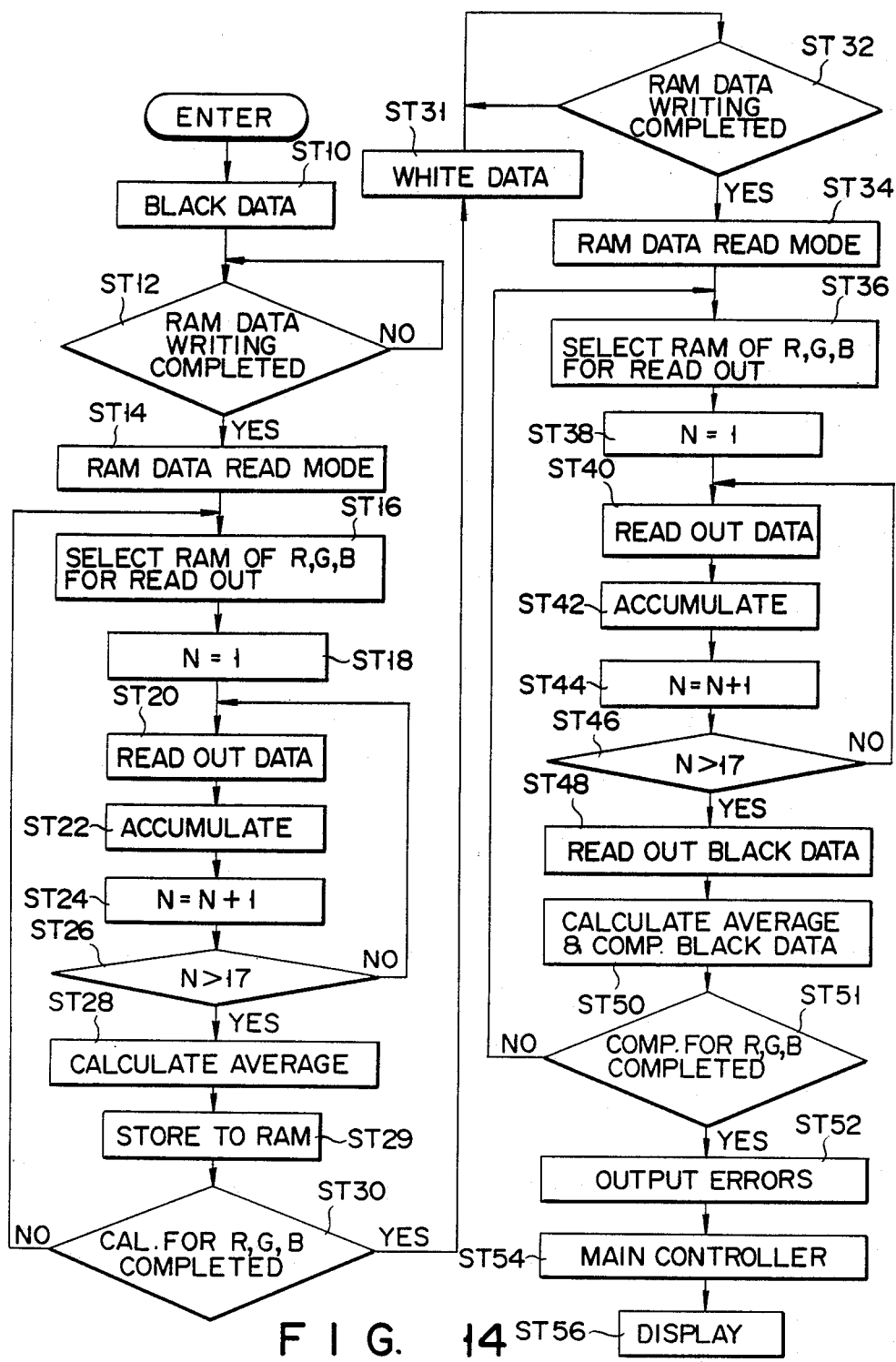
FIG. 14 is a flowchart illustrating one example of software executed by an arithmetic processor (CPU) shown in FIG. 13.

FIG. 14 illustrates software that the arithmetic processor (CPU) 132 in FIG. 13 executes.

First, R, G and B digital data d131R, d131G and d131B having 256 gradation levels are detected from the reflected light from the black reference plate REF (ST10), and the detected R, G and B data are respectively written in the RAMs 131R, 131G and 131B. Upon completion of the data writing (YES in ST12), the operation enters a data read mode (ST14).

In data read mode, a target RAM for data readout, e.g., RAM 131R for R data, is selected (ST16). When the read RAM is selected, a number N for specifying the pixel to be read out is set to 1 (ST18). As a result, the value (equal to or greater than 0 but less than 256) corresponding to the first pixel (N=1) in the RAM 131R is read out (ST20) and the read-out R data value is accumulated in a register (accumulator) in the arithmetic processor 132 (ST22).

Then, the number N is incremented by 1 (ST24). If the resulting value of N is equal to or less than 17, the sequence of the processes of ST20–ST24 is repeated while incrementing N by 1.

If N exceeds 17 (YES in ST26), the average of the R data for 17 pixels accumulated in the register in the arithmetic processor 132 is computed using the equation (3) (ST28), and the computed average R data (Rb) is stored in the memory 133 (ST29).

The same process as done for the R data in ST16–ST29 will be executed for G data and B data (NO in ST30).

When computation of all the averages of the R, G and B data with respect to the black reference plate is completed (YES in ST30), R, G and B digital data d131R, d131G and d131B having 256 gradation levels are detected from the reflected light from the white reference plate REF (ST31), and the detected R, G and B data are respectively written in the RAMs 131R, 131G and 131B. Upon completion of the data writing (YES in ST32), the operation enters a data read mode (ST34).

In data read mode, a target RAM for data readout, e.g., RAM 131R for R data, is selected (ST36). When the read RAM is selected, a number N for specifying the pixel to be read out is set to 1 (ST38). As a result, the value (equal to or greater than 0 but less than 256) corresponding to the first pixel (N=1) in the RAM 131R is read out (ST40) and the read-out R data value is accumulated in the register (accumulator) in the arithmetic processor 132 (ST42).

Then, the number N is incremented by 1 (ST44). If the resulting value of N is equal to or less than 17, the sequence of the processes of ST40–ST44 is repeated while incrementing N by 1.

If N exceeds 17 (YES in ST46), the average R data for the black reference stored in the memory 133 is read out first (ST48). Then, the average value of the R data for 17 pixels the white reference accumulated in the register in the arithmetic processor 132 is computed using the equation (2), and the computed average value (Rh) of the R data for white reference is compared with the average value (Rb) of the R data for the black reference read out from the memory 133 (ST50). This comparison is performed based on the equation (4) and the result is stored as data NR in the memory 133.

The same process as done for the R data in ST36–ST50 will be executed for G data and B data (NO in ST51), and the comparison results are stored respectively as data NG and data NB in the memory 133.

Upon completion of data comparison (equation (4)) for all the R, G and B data (YES in ST51), the data NR, NG and NB stored in the memory 133 are evaluated by the arithmetic processor 132. When the arithmetic processor 132 finds that even one of the data NR, NG and NB is smaller than a predetermined value (e.g., 0.6), it discriminates that the life expiration of the lamp 23 has reached.

When the arithmetic processor 132 discriminates that such is the case, it sends an error signal to the main controller 81 (ST52). Upon reception of the error signal, the main controller 81 sends, for example, a flicker signal to the display element (48$_7$) on the manipulation panel 6 (ST54), thereby flickering this element. Flickering the display element informs a user that the life expiration of the lamp has reached (ST56).

The software illustrated in FIG. 14 discriminates the life expiration of the lamp in use with a high accuracy when the sensor 30 in FIG. 13 detects two or more pixel data.

Figure 15:
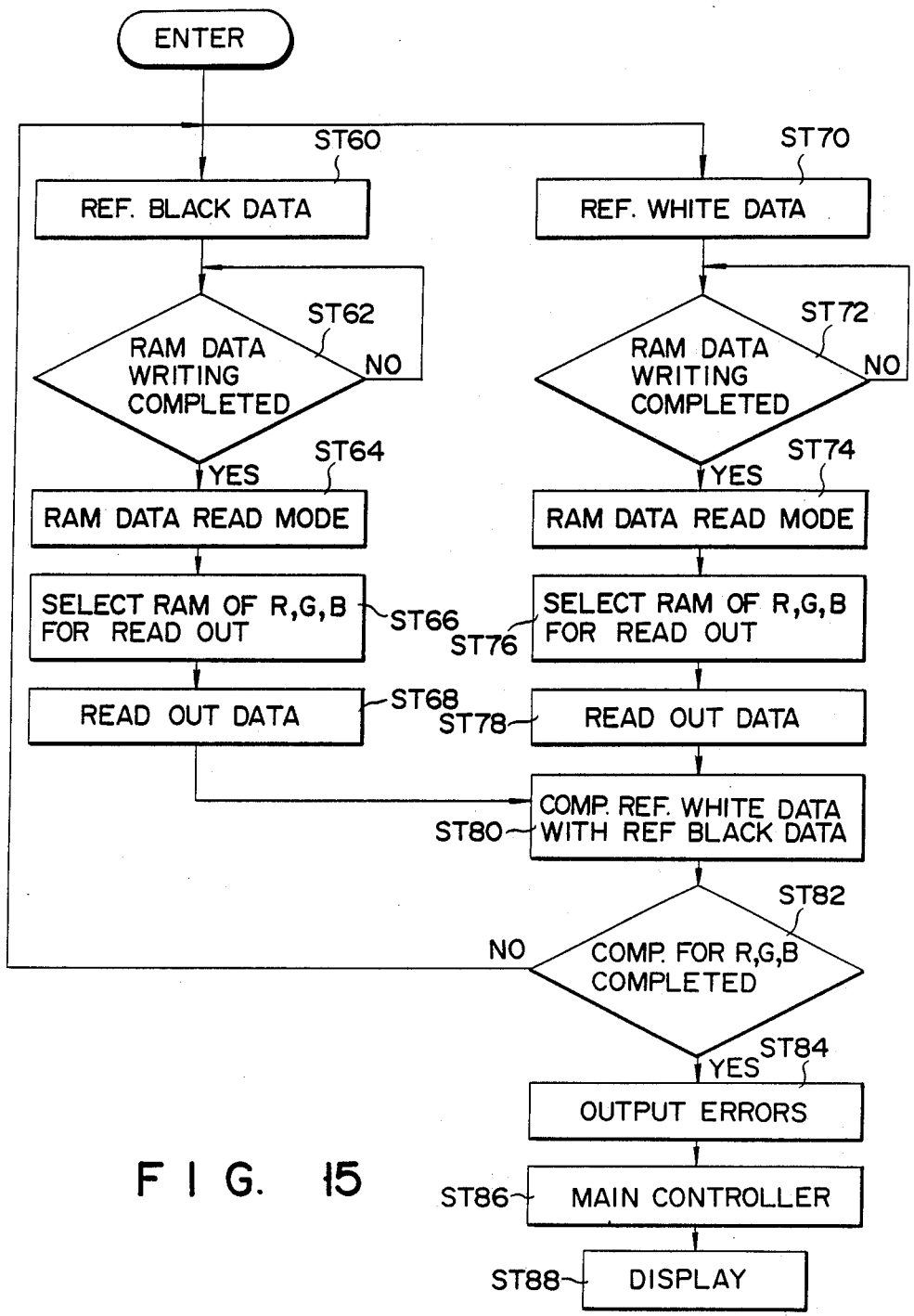
FIG. 15 is a flowchart illustrating another example of software executed by an arithmetic processor (CPU) shown in FIG. 13.

If the sensor 30 is a simple photosensor having a resolution for one pixel, the software run by the arithmetic processor (CPU) 132 in FIG. 13 may be simplified as shown in FIG. 15.

First, R, G and B data are obtained using the black reference plate (ST60), and the attained R, G and B data are respectively written in the RAMs 131R, 131G and 131B. Upon completion of data writing (YES in ST62), the operation enters a RAM read mode (ST64). In RAM read mode, it is determined from which one of the R, G and B RAMs data should be read out (ST66). In accordance with the decision, data of the individual color components for the black reference (corresponding to Rb, Gb and Bb in the equation (4)) are read out in the sequence of R, G and B, for example (ST68).

Similarly, R, G and B data are obtained using the white reference plate (ST70), and the attained R, G and B data are respectively written in the RAMs 131R, 131G and 131B. Upon completion of data writing (YES in ST72), the operation enters a RAM read mode (ST74). In RAM read mode, it is determined from which one of the R, G and B RAMs data should be read out (ST76). In accordance with the decision, data of the individual color components for the black reference (corresponding to Rb, Gb and Bb in the equation (4)) are read out in the sequence of R, G and B, for example (ST78).

When the R, G or B data for the black reference (Rb, Gb or Bb) and R, G or B data for the white reference (Rh, Gh or Bh) are read out, these data are compared with each other using the equation (4) (ST80).

Upon completion of the data comparison for all the R, G and B data (YES in ST82), if it is found that even one of the data NR, NG and NB (equation (4)) is smaller than a predetermined value (e.g., 0.6), an error signal informing the expiration of the lamp's life is sent to the main controller 81 from the arithmetic processor 132 (ST84). Upon reception of the error signal, the main controller 81 sends a flicker signal to the display element (48$_7$) on the manipulation panel 6 (ST86). This flickers this element to thereby inform a user that the life expiration of the lamp has reached (ST88).

The foregoing description has been given with reference to a case where light obtained using the white and black reference plates is separated into three primary color components R, G and B (or C, M and Y in complementary color relation with R, G and B).

According to the present invention, however, the life expiration of the lamp can be discriminated using a luminance signal (I or J) obtained by combining the three primary color data. In other words, the luminance signal (I) obtained from the R, G and B data using the relation given in the following equation (5) or the luminance signal (J) obtained from the C, M and Y data using the relation given in the following equation (6) are actually measured with respect to the white reference plate.

$$I = \begin{pmatrix} K1 \\ K2 \\ K3 \end{pmatrix} * \begin{pmatrix} R \\ G \\ B \end{pmatrix} \quad (5)$$

$$J = \begin{pmatrix} K4 \\ K5 \\ K6 \end{pmatrix} * \begin{pmatrix} C \\ M \\ Y \end{pmatrix} \quad (6)$$

where K1–K3 are matrix coefficients for the RGB system while K4–K6 are matrix coefficients for the CMY system.

When the luminance signal (I or J) is quantized by 8 bits, the life expiration check data NI or NJ is given by the following equations.

$$NI = I/256 \quad (7) \text{ or}$$

$$NJ = J/256 \quad (8)$$

If NI in the equation (7) or NJ in the equation (8) falls below a predetermined value (e.g., 0.6), it is discriminated that the life expiration of the lamp has reached.

Figure 16:
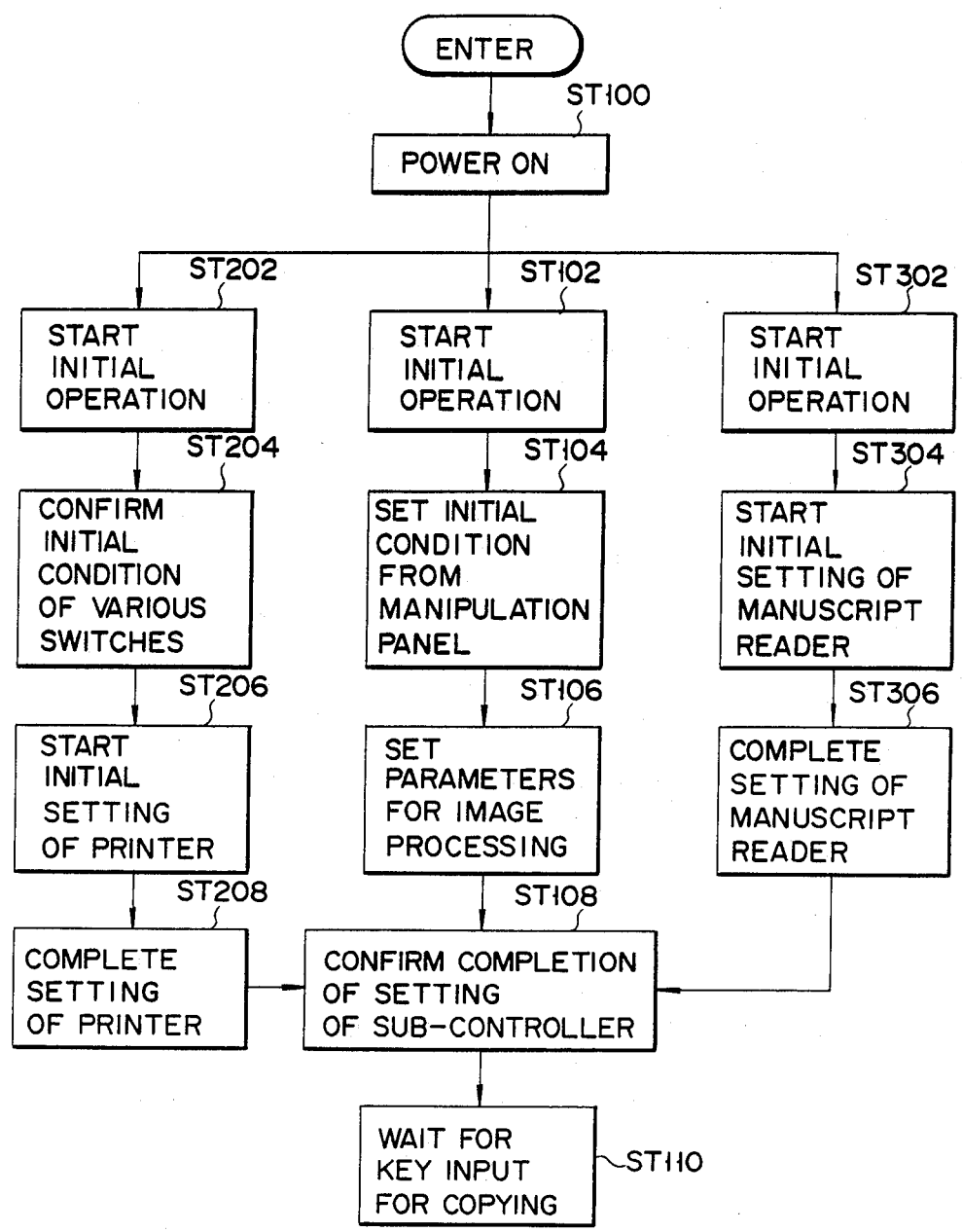
FIG. 16 is a flowchart illustrating the fundamental operation a main controller 81 and sub-controllers 82 and 83 shown in FIG. 1.

FIG. 16 illustrates the basic operations of the main controller 81 and sub-controllers 82 and 83 as shown in FIG. 1.

When the apparatus shown in FIG. 1 is activated (ST100), initialization (ST102) for the main controller 81, initialization (ST202) for the sub-controller 82 and initialization (ST302) for the sub-controller 83 start.

Upon completion of these initializations, various initial statuses are set to the main controller 81 through the manipulation panel 6 in FIG. 12 (ST104). Predetermined parameters for image processing are set in accordance with the set initial statuses (ST106).

In parallel to this processing (ST102–ST106) of the main controller 81, the sub-controller 83 after the initialization (ST202) confirms the initial statuses of various switches on the manipulation panel 6 (ST204). Predetermined initial setting is executed to the printer section (93–96; 51) in accordance with the confirmed initial statuses (ST206) and setting of the printer section is then completed (ST208).

In parallel to this processing (ST102–ST106) of the main controller 81, the sub-controller 82 after the initialization (ST302) executes predetermined initial setting of the manuscript reader (80, 90, 25, 91, 92) (ST304)

and setting of the manuscript reader is then completed (ST306).

Upon completion of setting of the parameters for image processing (ST106), setting of the printer section (ST208) and setting of the manuscript reader (ST306), the main controller 81 confirms checks if the setting operations by the sub-controllers 82 and 83 have been accurately done (ST108), and then waits for the copy start key to be pressed by the user (ST110).

As described above, the life expiration of the lamp 23 can accurately discriminated by reading a change in the ratio of the R, G and B components due to the usage and deterioration of the lamp 23. This always permits the use of the illumination lamp 23 having the ideal balance between the R, G and B components, thus ensuring a stable color reproducibility.

The means for detecting the R, G and B components of light from the illumination lamp 23 is not restricted to a simple photosensor 30, but may be a CCD line image sensor or a two-dimensional CCD image sensor. The filter section 29 may be disposed on such portion of the optical path of the photoelectric converter 25 for reading the image of an original as to avoid interference with the image reading, so that the life expiration of the lamp 23 can be discriminated using the output of the photoelectric converter 25.

The filters for separating color components of light from the illumination lamp 23 are not restricted to R, G and B types but may be C, M and Y filters as well.

Although the life expiration of the lamp is discriminated by computation (software) conducted by the main controller 81, the discrimination is in no way limited to this particular type. For instance, a change in white balance due to deterioration of the lamp may be discriminated by hardware such as a gate array or an analog circuit which executes the processing corresponding to the mentioned computation.

Although the foregoing description has been given with reference to a thermal color copying machine as an example of an image forming apparatus, the present invention can apply to an electronic copying machine, a facsimile and a video printer as well. The present invention may also apply to other apparatuses, such as an ink jet printer, a laser printer, a bubble jet printer, a dot impact printer and a silver-salt photographic apparatus.

Further, a buzzer may be provided on the main body of the apparatus to inform a user of the expiration of the lamp's life.

The present invention may be modified in various manners without departing from the scope of the invention.

As described above, the present invention can provide an image forming apparatus which can accurately discriminate the life expiration of a light source to thereby improve color reproducibility.

While the invention has been described in connection with what is presently considered to be the most practical and preferred embodiment, it is to be understood that the invention is not limited to the disclosed embodiment, but, on the contrary, is intended to cover various modifications and equivalent arrangements included within the scope of the appended claims, which scope is to be accorded the broadest interpretation so as to encompass all such modifications and equivalent arrangements.

What is claimed is:

1. An apparatus for detecting a life expiration of a light source comprising:
   means for sensing at least two color components of light obtained from the light source to provide a first color component signal and second color component signal;
   means for detecting a first amount of said first color component signal and a second amount of said second color component signal;
   means for comparing said first amount with said second amount to detect a specific relation between said first and second amounts; and
   means for referring said specific relation to a predetermined value to determine whether or not a life of said light source is expired, and indicating a life expiration of said light source when said specific relation matches said predetermined value.

2. An apparatus according to claim 1, wherein
   said sensing means includes means for sensing three primary color components of the light and provides a first color component signal, a second color component signal, and a third color component signal,
   said detecting means includes means for detecting a first value of said first color component signal, a second value said second color component signal, and a third value said third color component signal and
   said comparing means includes means for comparing said first value with each of said second and third values to provide said specific relation.

3. An apparatus according to claim 1, wherein
   said sensing means includes means for sensing three primary color components of light emitted from a reference white object,
   said detecting means includes means for combining the sensed three primary color components with predetermined coefficients to obtain a luminance signal, and
   said comparing means includes means for modifying said luminance signal to provide said specific relation.

4. An apparatus according to claim 1, wherein
   said sensing means includes means for sensing three primary color components of light emitted from a reference white object to provide a first color component signal, a second color component signal, and a third color component signal, and means for sensing three primary color components of other light emitted from a reference black object to provide a fourth color component signal, a fifth color component signal, and a sixth color component signal,
   said detecting means includes means for detecting a first value of said first color component signal, a second value of said second color component signal, a third value of said third color component signal, a fourth value of said fourth color component signal, a fifth value of said fifth color component signal, and a sixth value of said sixth color component signal, and
   said comparing means includes means for detecting a first difference between said first and fourth values to provide a first relation, means for detecting a second difference between said second and fifth values to provide a second relation, and means for detecting a third difference between said third and sixth values to provide a third relation, wherein said first, second, and third difference provide to said specific relation.

5. An apparatus according to claim 1, wherein
said sensing means includes means for sensing three primary color components of light emitted from a reference white object to provide first color component signals, second color component signals, and third color component signals, and means for sensing three primary color components of other light emitted from a reference black object to provide fourth color component signals, fifth color component signals, and sixth color component signals,
said detecting means includes means for detecting a first average value of said first color component signals, a second average value of said second color component signals, a third average value of said third color component signals, a fourth average value of said fourth color component signals, a fifth average value of said fifth color component signals, and a sixth average value of said sixth color component signals, and
said comparing means includes means for detecting a first difference between said first and fourth average values to provide a first relation, detects a second difference between said second and fifth average values to provide a second relation, and means for detecting a third difference between said third and sixth average values to provide a third relation, wherein said first, second, and third difference represent said specific relation.

6. An apparatus for detecting a life expiration of a light source comprising:
means for sensing at least two color components of light obtained from the light source to provide a first color component signal and second color component signal;
means for detecting a first amount of said first color component signal and a second amount of said second color component signal; and
means for comparing said first amount with said second amount to detect a ratio between said first and second amounts; and
means for referring the ratio detected by said comparing means to a predetermined value so as to determine whether or not a life of said light source is expired, and indicating a life expiration of said light source when the ratio detected by said comparing means reaches said predetermined value.

7. An apparatus for detecting a life expiration of a light source of a copying machine comprising:
means for extracting primary color components from light which is emitted from the light source and reflected by a reference white object;
means for converting first one of the primary color components into a first color signal, second one of the primary color components into a second color signal and a third one of the primary color components into a third color signal;
means for storing said first, second, and third color signals;
means for calculating a first integration value from the first color signal stored in said storing means, calculating a second integration value from the second color signal stored in said storing means, and calculating a third integration value from the third color signal stored in said storing means;
means for performing a comparison among said first, second, and third integration values to detect a ratio among said first, second, and third integration values; and
means for referring said ratio to a predetermined value so as to determine whether or not a life of said light source is expired, and indicating a life expiration of said light source when said ratio reaches said predetermined value.

8. An image forming apparatus comprising:
means for generating a light;
means for forming an image on an image-forming medium in accordance with image data obtained by irradiating light on an original from said generating means;
means for sensing light intensities of at least two color components of light from said generating means; and
means for detecting a change in white balance of the image formed on said image-forming medium in accordance with a change from a predetermined value in a relative ratio of said light intensities of said color components sensed by said sensing means, to thereby discriminate life expiration of said generating means.

9. An image forming apparatus comprising:
means for generating a light;
means for forming an image on an image-forming medium in accordance with image data obtained by irradiating light on an original from said generating means;
means for separating reflected light from a reference original obtained by irradiation of light from said generating means into at least two color components, and extracting said color components;
means for storing data representing a relative ratio of said at least two color components at a time of life expiration of said generating means; and
means for obtaining a relative ratio of said color components extracted by said separating means, and comparing the obtained specific ratio with the relative ratio data stored in said storing means, to thereby discriminate life expiration of said generating means.

* * * * *